(12) United States Patent
Takizawa et al.

(10) Patent No.: US 7,446,767 B2
(45) Date of Patent: Nov. 4, 2008

(54) GAME APPARATUS AND GAME PROGRAM

(75) Inventors: Satoru Takizawa, Kyoto (JP); Toshio Iwawaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 706 days.

(21) Appl. No.: 10/675,940

(22) Filed: Oct. 2, 2003

(65) Prior Publication Data

US 2004/0116181 A1    Jun. 17, 2004

(30) Foreign Application Priority Data

Dec. 12, 2002    (JP)    ............................. 2002-361446

(51) Int. Cl.
*G06T 15/60* (2006.01)
(52) U.S. Cl. ...................................... 345/426; 345/589
(58) Field of Classification Search ................. 345/426, 345/589
See application file for complete search history.

(56) References Cited

FOREIGN PATENT DOCUMENTS

JP    2001-079261    3/2001

OTHER PUBLICATIONS

Miller, "Colour Space Conversion—Part 1", Mar. 12, 2001.*
Sangwine, "Colour in image processing", Jan. 29, 2002.*
Atherton et al., "Polygon Shadow Generation", Program of Computer Graphics, Cornell University, pp. 275-281.*

* cited by examiner

*Primary Examiner*—Jeffery A. Brier
(74) *Attorney, Agent, or Firm*—Nixon & Vanderhye P.C.

(57) ABSTRACT

In the game space, n light sources for irradiating an object with a light beam are set. A brightness calculating section 521 and a texture coordinate generating section 522 obtain, for each of predetermined units forming the object, a brightness vector having as components n illumination intensities respectively added by the n light sources. A texture color determining section 523 determines, for each of the predetermined units, a region including a tip of the brightness vector from among regions obtained via division by threshold values based on relationships in size between the n illumination intensities and their corresponding threshold values. A display color determining section 524 determines a display color for each of the predetermined units based on the region determined for each of the predetermined units, such that the object's display color distinctly varies.

22 Claims, 12 Drawing Sheets

GAME APPARATUS AND GAME PROGRAM

FIELD OF THE INVENTION

The present invention relates to a game apparatus and game program, and more particularly to a game apparatus and game program for displaying an object using toon shading.

BACKGROUND AND SUMMARY OF THE INVENTION

Conventionally, there are known image generating systems for generating an image viewed from a given viewpoint in a three-dimensional virtual space. Such systems are conventionally used in game apparatuses. Some of the systems generate a realistic image in order to improve artificial reality of a virtual space. Further, some of the systems generate animated cartoon cell picture-like images in order to represent the virtual space in the manner of an animated cartoon. In such systems, an object in the virtual space is distinctly (i.e., clearly) shaded, thereby generating a cartoon-like image.

One conventional technology for generating the cartoon-like image uses a so-called toon shading technique. FIG. 12 is a diagram illustrating an exemplary display of an image generated by the conventional technology using toon shading. A general process of generating an image using toon shading is described below with reference to FIG. 12. In this process, brightness information is initially added to an object in a virtual space based on a prescribed condition. For example, the brightness information is added by irradiating the object with a light beam from a virtual light (light source) 91 provided at a point in the virtual space. Then, the object is divided into a plurality of portions in accordance with the brightness information. For example, consider a case of dividing the object into two grades (two areas). The object is divided into a bright area 92 and a dark area 93 in accordance with brightness provided by the virtual light 91. Finally, color values are set differently between the bright area 92 and the dark are 93, thereby representing the object using the color values of two grades. In this manner, the conventional technology generates a cartoon-like image in gradual shades.

In some cases, a game apparatus or a game system shades the object in accordance with a special effect generated in a game space. For example, the object is shaded so as to be viewed as if it is illuminated by lightning or explosion, as well as by a normal light beam provided in the game space. Also, there may be a case where the object is shaded so as to be viewed as if it is illuminated by light beams from two or more places without using a light beam provided as a special effect, e.g., lightning or explosion.

In the above-described conventional technology, however, the state of the object illuminated by the light beams from two or more places cannot be represented using toon shading. This is because the brightness information used with toon shading in the conventional technology is defined by a prescribed condition (e.g., the virtual light 91 as described above), and therefore the brightness information cannot be used for representing a light beam (e.g., a light beam provided as a special effect) different from the normal light beam. Specifically, in the example of FIG. 12, the brightness information is defined by the light beam illuminating the object from the position of the virtual light 91, and therefore even if the brightness information is used, the state of the object illuminated by a light beam from a position other than the position of the virtual light 91 cannot be represented.

Accordingly, in the conventional technology, the state of the object illuminated by the light beam provided as a special effect is represented by shading the object without using toon shading, or such a state is represented without shading the object. As a result, in the conventional technology, the object to be represented as a cartoon-like object is realistically shaded, or the object is not shaded at all. Therefore, the state of the object illuminated by the light beams from two or more places, typically, as in the case where the light beam provided as a special effect is used, cannot be satisfactorily represented using toon shading, resulting in an unnatural image. In order to shade the object so as to be viewed as if it is illuminated by the light beams from two or more places, an extra process is required in addition to toon shading, leading to an increase in the number of processes for image generation. Thus, in some cases, the above-described conventional technology cannot be used in a game apparatus or the like which requires real-time image generation.

Therefore, a feature of the illustrative embodiments is to provide a game apparatus and game program capable of representing the state of an object illuminated by light beams from two or more places using the toon shading.

The illustrative embodiments have the following features to attain the feature mentioned above. It should be noted that reference numerals and supplemental remarks in brackets are provided in the following description in order to indicate correspondence with embodiments, which will be described for facilitating easy understanding of the illustrative embodiments, rather than to limit the scope of the present invention.

A first aspect of the illustrative embodiments is directed to a game apparatus (a game apparatus 101) for displaying an object in a game space. The game apparatus includes: a light source setting section (a CPU 202 and/or a GPU 204 implementing steps S12 and S14; hereinafter, only step numbers are shown); a brightness calculating section (a brightness calculating section 521 and a texture coordinate generating section 522, S21 and S22); a threshold value storage section (a threshold value data storage region 205*e*); a region determining section (a texture color determining section 523, S23 through S29); and a display color determining section (a display color determining section 524, S30). The light source setting section sets, in the game space, n light sources (a normal light 64 and an effect light 65) (where n is an integer equal to or more than 2) for irradiating the object with a light beam. The brightness calculating section calculates, for each of the predetermined units forming the object, a brightness vector having as components n illumination intensities (first and second illumination intensities) respectively added by the n light sources. The threshold value storage section has threshold values of the n illumination intensities (first and second threshold values) stored therein. The threshold values are used for dividing a coordinate region for the brightness vector into at least three regions (first through fourth regions). The region determining section determines, for each of the predetermined units, a region including a tip of the brightness vector calculated by the brightness calculating section from among the regions obtained via division by the threshold values based on relationships in size between the n illumination intensities and their corresponding threshold values. The display color determining section determines a display color for each of the predetermined units based on the region determined for each of the predetermined units by the region determining section, such that the object's display color distinctly varies.

As described above, in the first aspect, n types of illumination intensities added by the n light sources are calculated. Toon shading is performed using an n-dimensional brightness vector having the n types of illumination intensities as components, and a coordinate region and threshold value of the brightness vector, and the display color of each of the predetermined units forming the object is determined. In this manner, the brightness added by the n light sources is represented using the n-dimensional vector and the coordinate region, whereby it is possible to separately represent the influence of n different light beams on each of the predetermined units. Moreover, since toon shading is performed using the n-dimensional vector and the coordinate region, and then the object's display color is determined, it is possible to determine, for each of the predetermined units, the display color on which the influence of the n different light beams are reflected. Thus, it is possible to represent the state of the object illuminated by the n different light beams using toon shading.

Alternatively, in the first apparatus, the light source setting section may set a first light source (a first light (the normal light 64)) emitting a light beam of a first color (red), and a second light source (a second light (the effect light 65)) emitting a light beam of a second color (green) which is different from the first color. The brightness calculating section may calculate, for each of the predetermined units forming the object, a brightness vector composed of the illumination intensities corresponding to values of color components of the first and second colors. The region determining section may determine the region including the tip of the brightness vector by determining a relationship in size between the value of the color component of the first color and its corresponding first threshold value, and a relationship in size between the value of the color component of the second color and its corresponding second threshold value.

Accordingly, each illumination intensity is calculated based on a corresponding one of the values of color components of the first and second colors, and therefore when calculating an illumination intensity added by one of the first and second light sources, it is not necessary to consider the influence of the other light source. That is, each illumination intensity is calculated based on a value of a different color component, and therefore can be separately calculated. Thus, it is possible to simultaneously set the two light sources and calculate the illumination intensities added by the two light sources. Moreover, it is possible to accurately calculate an illumination intensity added by one of the two light sources without being influenced by the other light source.

Alternatively, still, in the first aspect, the first color may be either one of red, green, or blue. In this case, the second color differs from the first color, and is either one of red, green, or blue.

Thus, it is possible to represent the illumination intensities using each component value of color data represented by RGB values.

Alternatively still, in the first aspect, the coordinate region may be divided into different regions by the first threshold value, and may further be divided into different regions by the second threshold value. In this case, the display color determining section determines display colors of different brightness in accordance with the regions obtained by division by the first threshold value, and determines display colors of different types in accordance with the regions obtained by division by the second threshold value.

Accordingly, the brightness of the display color of each of predetermined units varies in accordance with the illumination intensity added by the first light source. Also, the brightness of the display color of each of the predetermined units varies in accordance with the illumination intensity added by the second light source. Thus, the first and second light sources can be used for representing shades due to light beams of different types.

Alternatively still, in the first aspect, the display color determining section may determine, in accordance with the regions obtained by division by the second threshold value, either a color used for representing an object influenced by a special effect generated in the game space or a color used for representing an object in the case where no special effects are generated.

Thus, the second light source can be used for representing shades due to a light beam provided as the special effect. The special effect as described herein refers to lightning or explosion generated in the game space.

Alternatively still, in the first aspect, the game apparatus may further include a special effect determining section (S13). The special effect determining section determines whether the special effect is generated in the game space. The light source setting section provides the second light source only when the special effect determining section determines that the special effect has been generated.

Accordingly, it is possible to irradiate the object with the light beam provided as the special effect when necessary, i.e., only when the special effect is generated. Thus, it is possible to represent the state of the object illuminated by the special effect which is temporarily generated.

Alternatively still, in the first aspect, the game apparatus may further include a display color storage section (a basic display color data storage region 205d). The display color storage section has basic display colors stored therein. The basic display colors are used for determining the display color of each object. In this case, the display color determining section determines the display color based on the region determined by the region determining section and the basic display colors stored in the display color storage section.

Alternatively, still, in the first aspect, the region determining section may represent a determined region by a numerical value. The display color determining section may determine the display color by performing a predetermined calculation using the numerical value representing the region determined by the region determining section and color data for the basic display colors.

Accordingly, it is possible to determine the display color by performing the predetermined calculation, and therefore it is not necessary to prepare a table in which the region determined by the region determining section is associated with the basic display colors, for example. Thus, it is possible to conserve a storage region of the game apparatus.

A second aspect of the illustrative embodiments is directed to a game apparatus for displaying an object in a game space. The apparatus includes: a first light source setting section (S12); a second light source setting section (S14); a brightness calculating section (the brightness calculating section 521 and the texture coordinate generating section 522, S21 and S22); a threshold value storage section (the threshold value data storage region 205e); a first detecting section (the texture color determining section 523, S23); a second detecting section (the texture color determining section 523, S24 and S25); and a display color determining section (the display color determining section 524, S30). The first light source setting section sets, in the game space, a first light source (the normal light 64) for irradiating the object with a light beam. The second light source setting section sets, in the game space, a second light source (the effect light 65) which is different from the first light source. The brightness calculating section calculates, for each of predetermined units forming the object, a first illumination intensity added by the first light source and a second illumination intensity added by the second light source. The threshold value storage section has threshold values of the first and second illumination intensities stored therein. The first detecting section detects, for each of the predetermined units, a relationship in size between the first illumination intensity and its corresponding threshold value. The second detecting section detects, for each of the predetermined units, a relationship in size between the second illumination intensity and its corresponding threshold value. The display color determining section determines a display color for each of the predetermined units based on detection results obtained for each of the predetermined units by the first and second detecting sections, such that the object's display color distinctly varies.

As described above, in the second aspect, two types of illumination intensities added by the two light sources are calculated. Toon shading is performed using the illumination intensities and the threshold values, and the display color of each of the predetermined units forming the object is determined. In this manner, the brightness added by the two light sources is represented using the two types of illumination intensities, whereby it is possible to separately represent the influence of two different light beams on each of the predetermined units. Moreover, since toon shading is performed using the two illumination intensities, and then the object's display color is determined, it is possible to determine, for each of the predetermined units, the display color on which the influence of the two different light beams are reflected. Thus, it is possible to represent the state of the object illuminated by the two different light beams using toon shading.

In the first and second aspects, the predetermined units are typically polygons forming the object.

A third aspect of the illustrative embodiments is directed to a computer-readable recording medium having a game program recorded therein. The game program causes a game apparatus to implement functions achieved by the first aspect.

A fourth aspect of the illustrative embodiments is directed to a computer-readable recording medium having a game program recorded therein. The game program causes a game apparatus to implement functions achieved by the second aspect.

These and other features, aspects and advantages of the illustrative embodiments will become more apparent from the following detailed description of the illustrative embodiments when taken in conjunction with the accompanying drawings.

DETAILED DESCRIPTION OF THE PREFERRED EMBODIMENTS

Figure 1:
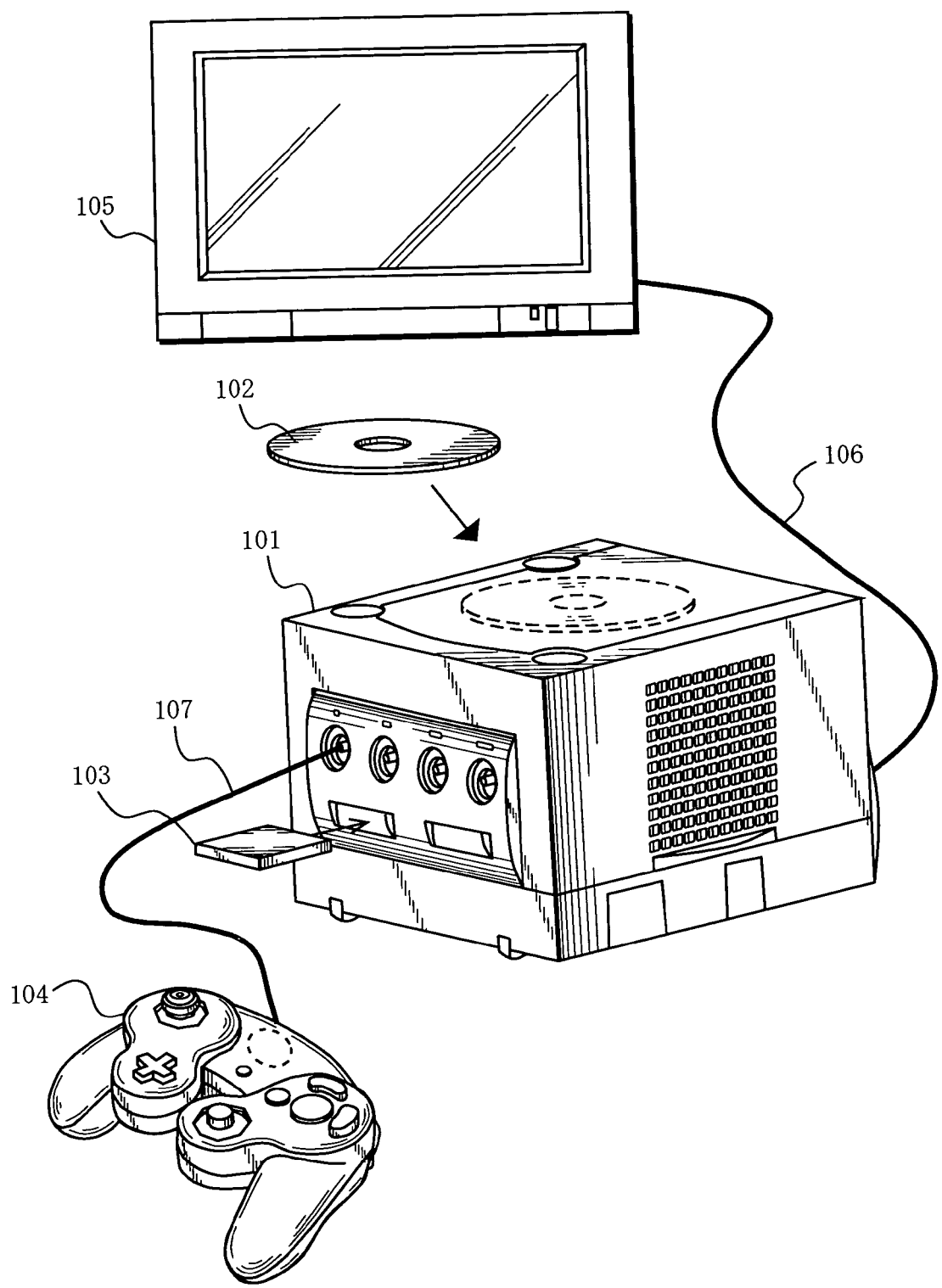
FIG. 1 is an external view of a game system according to an illustrative embodiment of the present invention.
Figure 2:
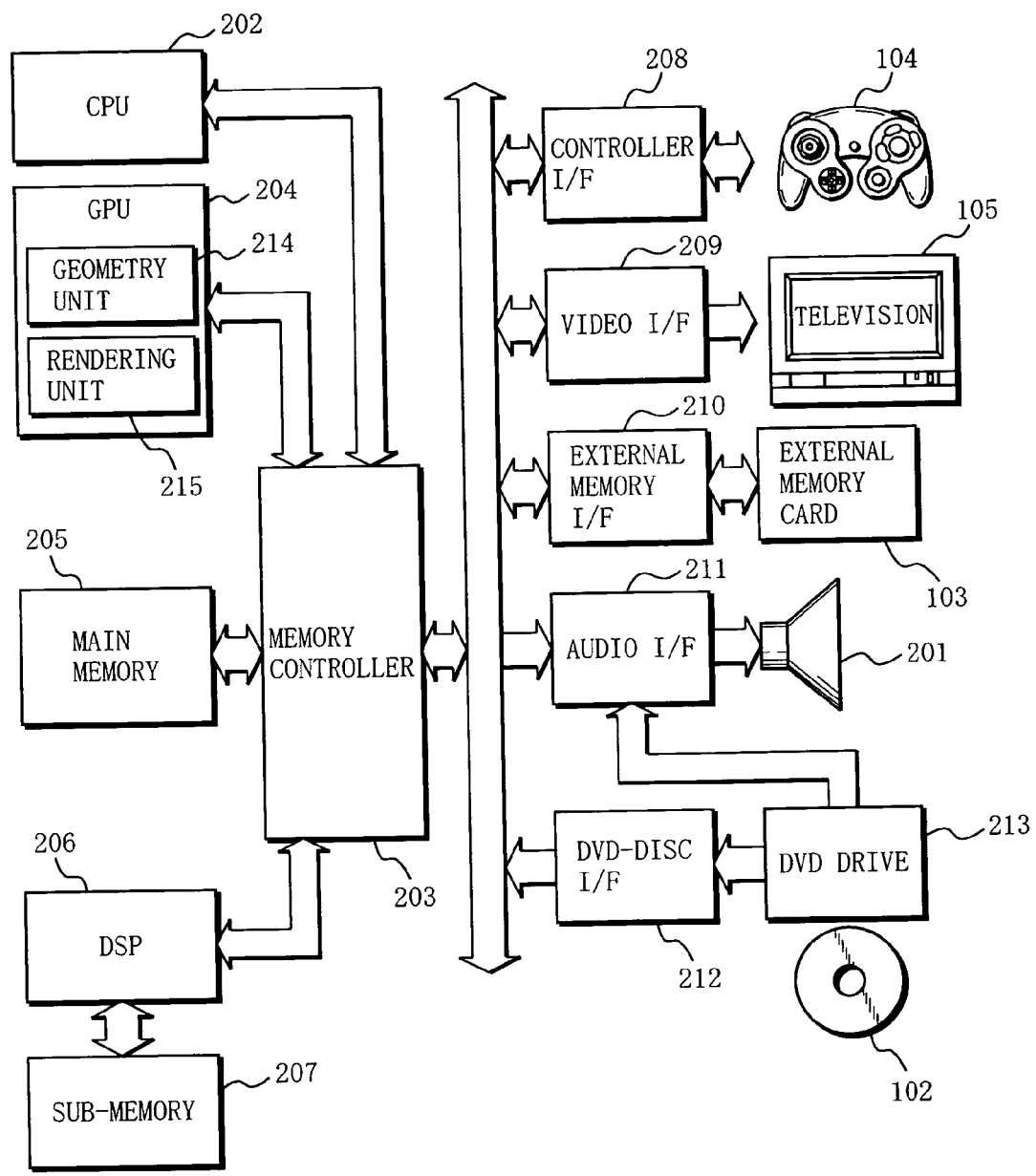
FIG. 2 is a block diagram illustrating a structure of the game system illustrated in FIG. 1.

FIG. 1 is an external view of a game system according to an illustrative embodiment of the present invention. FIG. 2 is a block diagram illustrating a structure of the game system illustrated in FIG. 1. As shown in FIGS. 1 and 2, the game system includes: a game apparatus 101; a DVD-ROM 102; an external memory card 103; a controller 104; a loudspeaker 201; and a television receiver 105 (hereinafter, simply referred to as the "television 105"). The DVD-ROM 102 and the external memory card 103 are removably placed within the game apparatus 101. The television 105 is connected to the game apparatus 101 via an AV cable 106. The controller 104 is connected via a communication cable 107 to any one of a plurality of controller port connectors provided in the game apparatus 101 (in FIG. 1., four of such connectors are shown). In other embodiments, communication between the game apparatus 101 and the controller 104 may be performed via radio without using the communication cable 107. Each element of the game system according to the present embodiment will be described in detail below with reference to FIG. 2.

The DVD-ROM 102, which is described as an exemplary external recording medium usable in the present invention, includes permanently stored data related to a game, e.g., a game program, character data, etc. When the player plays the game, the DVD-ROM 102 is placed within the game apparatus 101. Note that a means for storing the game program, etc., is not limited to the DVD-ROM 102, and a recording medium, such as a CD-ROM, an MO, a memory card, a ROM cartridge, or the like, can be used for storing the game program. The external memory card 103 is formed by a rewritable recording medium, such as a flash memory, and typically stores data, such as save data of the game.

The game apparatus 101 reads the game program stored in the DVD-ROM 102, and performs game processing. Details of the structure of the game apparatus 101 will be described later. The controller 104 is an input device for the player to input information related to game operation, and includes a plurality of operating switches. The controller 104 outputs operation data to the game apparatus 101, for example, in response to the player pressing an operating switch. The television 105 displays on its screen image data outputted by the game apparatus 101. The loudspeaker 201 is typically included in the television 105, and produces sound which is generated during the game and outputted by the game apparatus 101.

Next, the structure of the game apparatus 101 is described in detail. Referring to FIG. 2, the game apparatus 101 includes a CPU 202 and a memory controller 203 connected thereto. In the game apparatus 101, the memory controller 203 is further connected to a graphics processing unit (GPU) 204, a main memory 205, and a plurality of interfaces (I/Fs) 208 through 212. The memory controller 203 is also connected to a sub-memory 207 via a digital signal processor (DSP) 206. The memory controller 203 controls data transfer between the above-mentioned elements.

In order to start the game, a DVD drive 213 initially drives the DVD-ROM 102 placed within the game apparatus 101. Then, the game program stored in the DVD-ROM 102 is read onto the main memory 205 via a DVD disc I/F 212 and the memory controller 203. The CPU 202 implements the game program on the main memory 205, so that the game is started. After the game is started, the player uses the operating switches of the controller 104 to provide inputs related to game operation or the like. In accordance with the inputs provided by the player, the controller 104 outputs operation data to the game apparatus 101. The operation data outputted by the controller 104 is inputted to the CPU 202 via a controller I/F 208 and the main controller 203. The CPU 202 performs game processing in accordance with the operation data inputted. The GPU 204 and the DSP 206 are used for generating image data during the game processing, for example. The sub-memory 207 is used when the DSP 206 performs prescribed processing.

Figure 4:
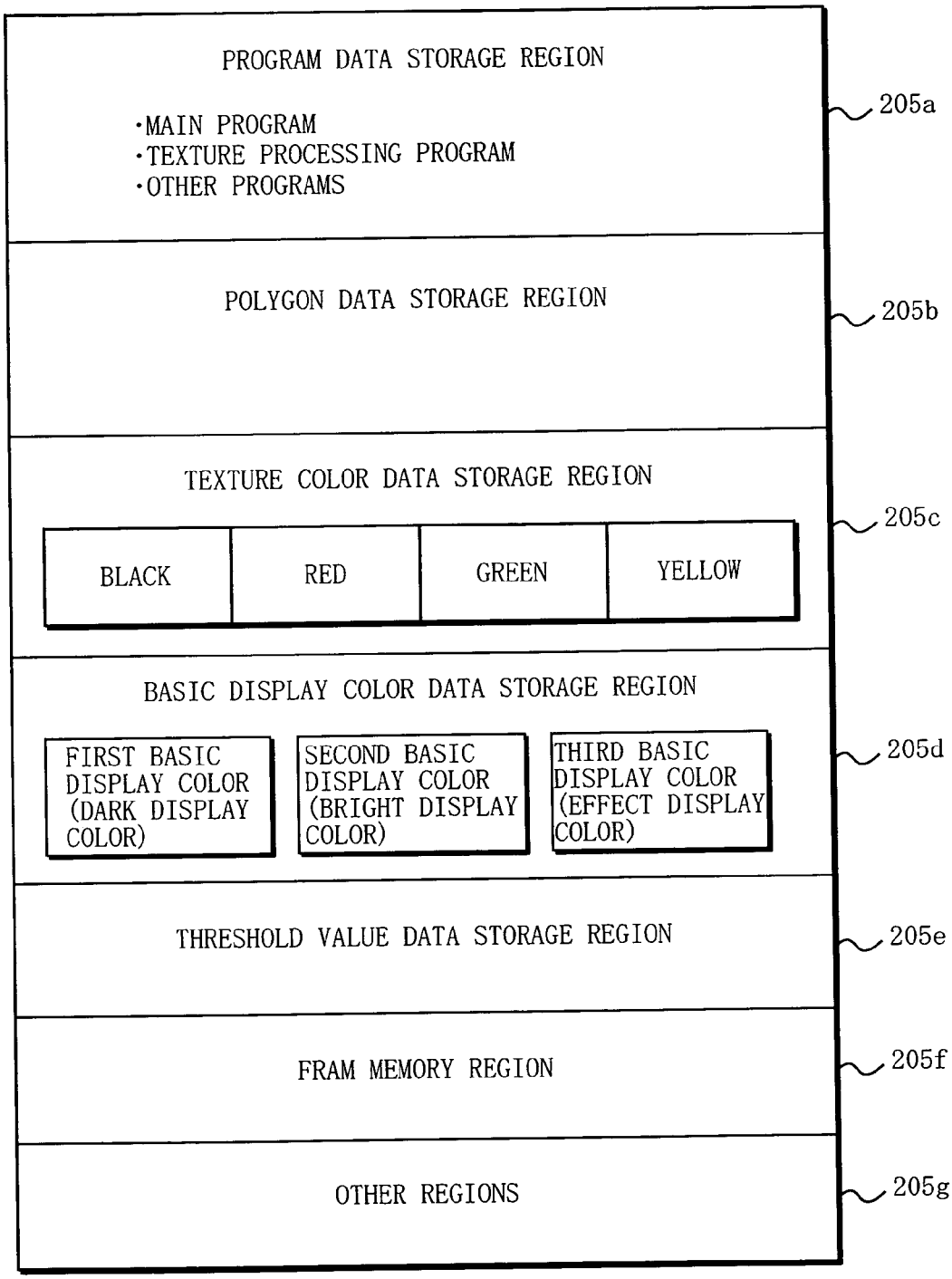
FIG. 4 is a diagram illustrating what data is stored in which region of a main memory 205.

The GPU 204 includes a geometry unit 214 and a rendering unit 215. The geometry unit 214 performs arithmetic processing regarding coordinates of a three-dimensional model (e.g., an object formed by polygons) related to an object or graphics placed in a game space, which is a virtual three-dimensional space. Examples of such arithmetic processing include the rotation, scaling, and deformation of the three-dimensional model, and coordinate conversions from the world coordinate system to the viewing coordinate system or screen coordinate system. Based on a prescribed texture (which is used for forming a design or patterns and is different from the texture as used in the term "texture color" which will be described later), the rendering unit 215 generates a game image by writing to a color buffer 216 color data (RGB data) of each pixel of the three-dimensional model projected onto the screen coordinate system. The GPU 204 uses a portion of the main memory 205 as memory for image processing (e.g., a frame memory region 205f as shown in FIG. 4). The GPU 204 uses the geometry unit 214 and the rendering unit 215 to generate image data to be displayed on the television 105 and suitably outputs the image data to the television 105 via the memory controller 203 and a video I/F 209. Audio data generated by the CPU 202 during the implementation of the game program is outputted via the memory controller 203 through an audio I/F 211 to the loudspeaker 201. In the present embodiment, the portion of the main memory 205 is used as the memory for image processing. However, hardware configuration including an additional memory exclusively used for image processing can be employed.

Figure 3:
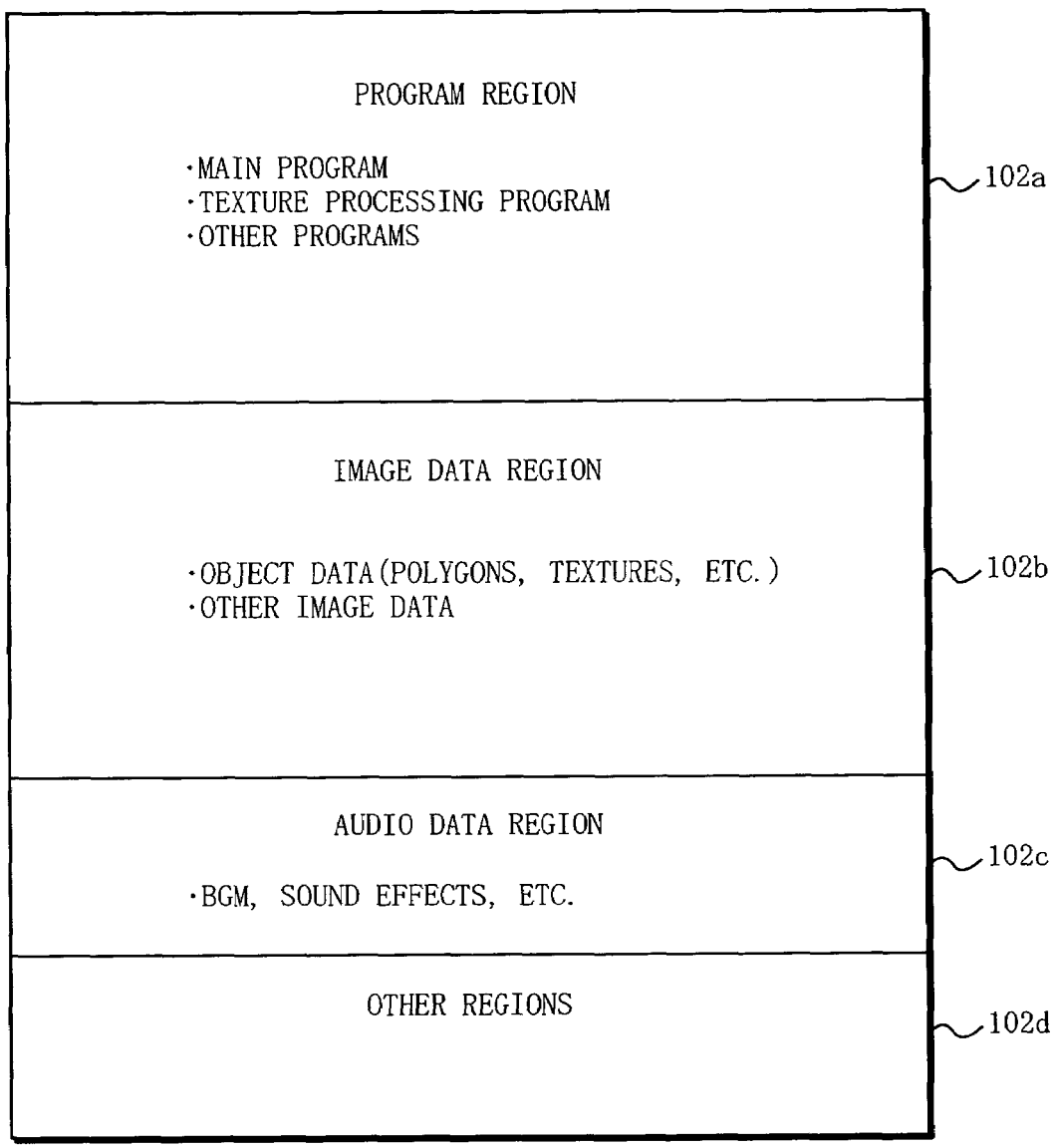
FIG. 3 is a diagram illustrating what data is stored in which region of a DVD-ROM 102.

FIG. 3 is a diagram illustrating what data is stored in which region of the DVD-ROM 102. The DVD-ROM 102 includes: a program region 102a; an image data region 102b; an audio data region 102c; and a set of other regions 102d. In the program region 102a, a main program of the game, a texture process program, and other programs are stored. The texture process program is used for causing the game apparatus to perform a process for setting display colors of polygons, which form the object, using toon shading. The details of this process will be described later. In the image data region 102b, for example, object data, which includes data related to polygons forming objects and data related to textures of the objects, is stored. In the audio data region 102c, data for background music (BGM) of the game, sound effects during the game, etc., is stored.

FIG. 4 is a diagram illustrating what data is stored in which region of the main memory 205. The main memory 205 includes a program data storage region 205a; a polygon data storage region 205b; a texture color data storage region 205c; a basic display color data storage region 205d; a threshold value data storage region 205e; a frame memory region 205f; and a set of other regions 205g. In the program data storage region 205a, the game program (including the main program, the texture process program, etc.), which is read from the DVD-ROM 102 when the game is started, is stored. In the polygon data storage region 205b, data for polygons used for forming an object is stored.

In the texture color data storage region 205c, color data for texture colors, which are generated by toon conversion during a texture process as described later, is stored. In the present embodiment, the color data stored includes data for four texture colors, i.e., black, red, green, and yellow. The texture color data is represented by RGB values. As described above, the texture as used in the term "texture color" is different from the texture used for forming a design or patterns on an object.

In the basic display color data storage region 205d, color data (RGB values) for basic display colors used for determining the display color of the object is stored. In the present embodiment, three types of basic display color data are stored for each object. The three types of basic display colors are separately referred to as the "first basic display color", the "second basic display color", and the "third basic display color". Specifically, the first basic display color represents the object in a normal state (where no special effects are added), and is relatively darker than the second basic display color. The second basic display color represents the object in a normal state, and is relatively lighter than the first basic display color. The third basic display color is also referred to as the "effect display color", and represents the object in the state of being influenced by a special effect generated in the game space. The term "special effect" as described herein refers to, for example, lightning or explosion generated in the game space. For example, in the case where the object is a green cap, dark green is set as the first basic display color, and light green color is set as the second basic display color. Moreover, a color, e.g., pale blue, which indicates that the cap is illuminated by the lightning, is set as the third basic display color. Typically, the third basic display color is set so as to be different in type from the first and second basic display colors.

In the threshold value data storage region 205e, first and second threshold values are stored. These values are used for performing toon conversion during the texture process as described later. Note that a plurality of first threshold values may be stored, and similarly, a plurality of second threshold values may be stored. Specifically, by setting the plurality of first and/or second threshold values, it is possible to divide a coordinate region of a coordinate system, which will be described in conjunction with FIG. 6, into at least six regions. Detailed description as to the division of the coordinate region will be given later.

The frame memory region 205f is used as memory for image processing by the GPU 204. In the frame memory region 205f, for example, color buffers or z-buffers are assigned. In the set of other regions 205g, variables used for the game processing other than the values and data described above are stored.

Figure 5:
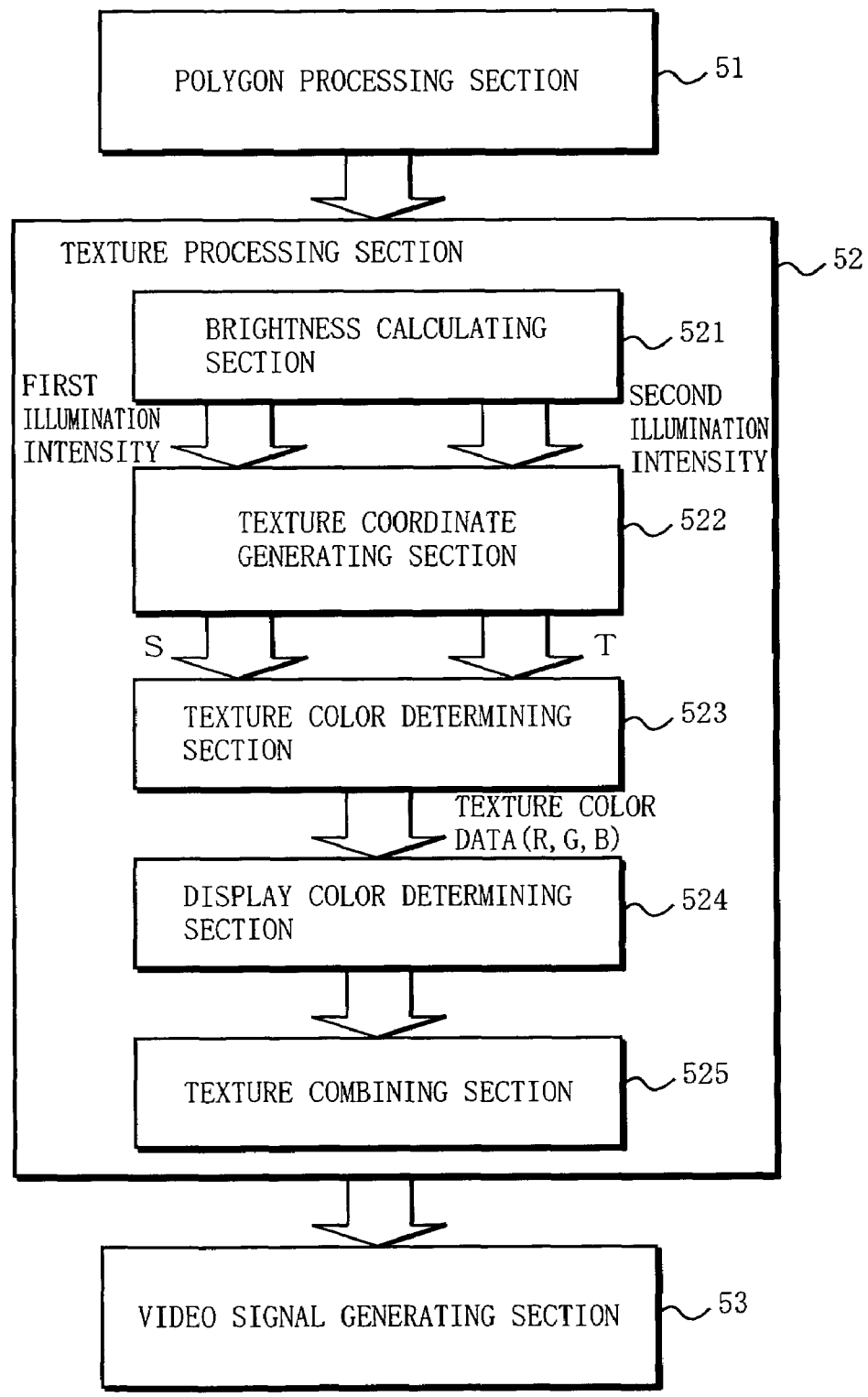
FIG. 5 is a diagram illustrating functional elements of the game apparatus illustrated in FIG. 1.

Next, feature parts of the game apparatus according to the present embodiment will be described with reference to FIGS. 5, 6A, and 6B. FIG. 5 is a conceptual diagram illustrating the feature parts, i.e., functional elements, of the game apparatus according to the present embodiment. The game apparatus performs the toon shading on an object in a three-dimensional game space in order to set distinctly varying display colors (shades). In the game apparatus, two light sources (lights) are used for toon shading, and the two light sources enable setting of three types of display colors (a light color, a dark color, and a color used for a special effect) for each object. Accordingly, the game apparatus is able to represent the state of the object illuminated by light beams from two or more places with a cartoon-like image (such a state will be described later with reference to FIG. 10). The outline of the operation of the game apparatus will be described below.

In FIG. 5, the game apparatus includes a polygon processing section 51, a texture processing section 52, and a video signal generating section 53. The polygon processing section 51 initially forms an object to be displayed using polygons. In the present embodiment, a texture process is performed on each of the polygons forming the object. Specifically, the texture processing section 52 determines a display color for each polygon. The texture processing section 52 is described in detail below.

Figure 10:
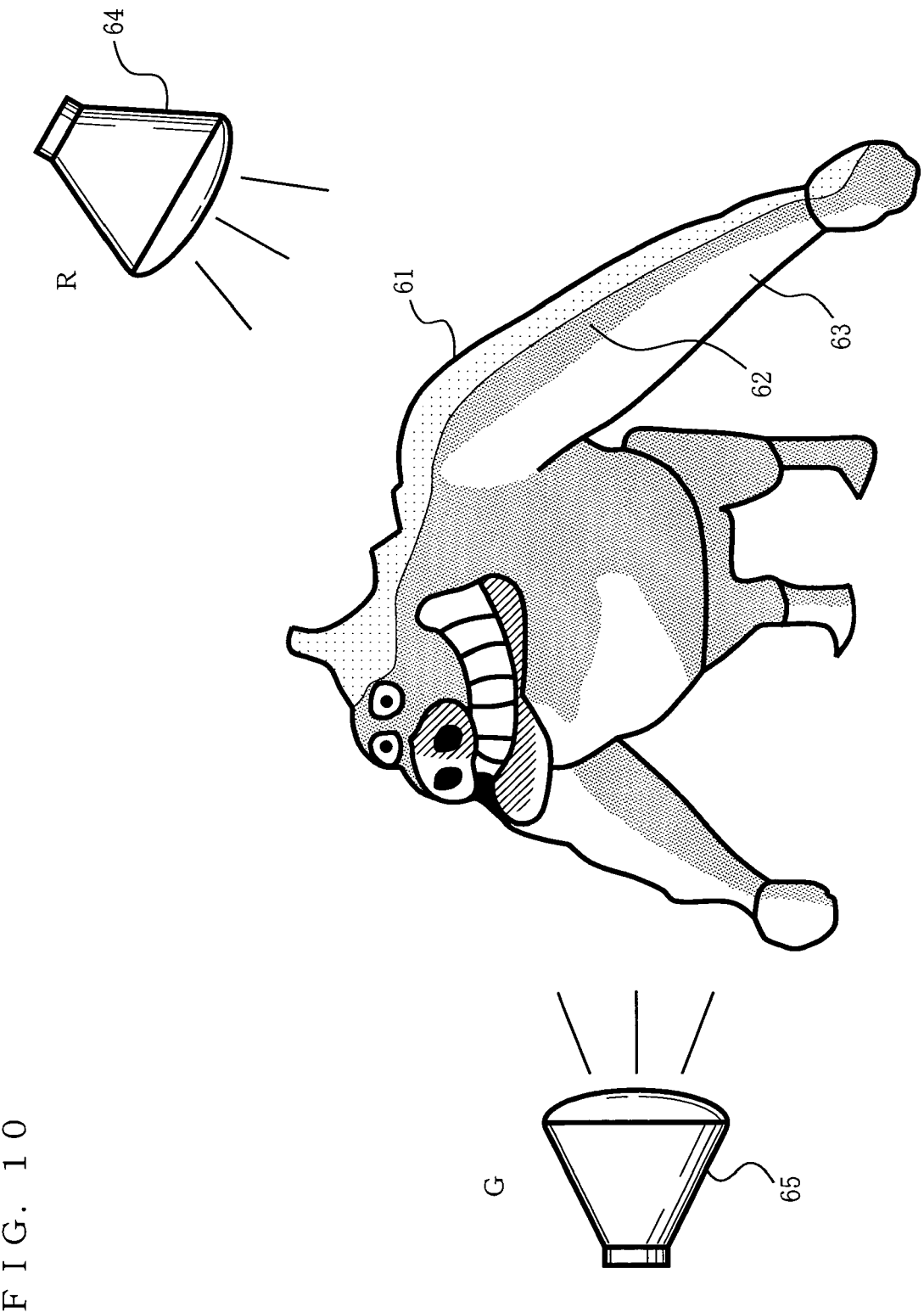
FIG. 10 is a diagram illustrating an exemplary display of an object displayed in the case where a special effect is generated.

As illustrated in FIG. 5, the texture processing section 52 includes: a brightness calculating section 521; a texture coordinate generating section 522; a texture color determining section 523; a display color determining section 524; and a texture combining section 525. The brightness calculating section 521 calculates brightness added by lights with respect to each vertex of the polygons. The following description is provided with respect to a case (as shown in FIG. 10) where two virtual lights for the toon shading process are provided in the game space where the object is present. In the present embodiment, the two virtual lights are respectively referred to as the "first light" and the "second light". The first light is a red light for emitting a red light beam, and the second light is a green light for emitting a green light beam. The brightness calculating section 521 calculates brightness added by each of the two lights. Herein, the brightness added by a given light is referred to as the "illumination intensity". More specifically, the brightness added by the first light is referred to as the "first illumination intensity", and the brightness added by the second light is referred to as the "second illumination intensity". In the present embodiment, the brightness calculating section 521 calculates the first illumination intensity added by the first light (the red light), and the second illumination intensity added by the second light (the green light). A vector having the first and second illumination intensities as its components is referred to as the "brightness vector".

Herein, the first illumination intensity refers to a value of an R component of color data (represented by RGB values) at a vertex of a polygon; and the second illumination intensity refers to a value of a G component of the color data at the vertex of the polygon. That is, the brightness calculating section 521 calculates the first illumination intensity by extracting the R component from the color data (R,G,B) at the vertex of the polygon, and calculates the second illumination intensity by extracting the G component from the color data (R,G,B) at the vertex of the polygon. Accordingly, in the case where the color data at the vertex of the polygon is represented by, for example, $(R_1, G_1, B_1)$, $(R_1, G_1)$ is obtained as a brightness vector. In the following description, the color data is represented by R, G, and B components each represented in 256 shades of color. In other embodiments, any method, including a method which uses color data for a polygon colored by virtual lights, may be used for calculating each component (each illumination intensity) of the brightness vector.

The texture coordinate generating section 522 generates a texture coordinate value (S,T) based on the first and second illumination intensities. The texture coordinate value is a two-dimensional vector representing illumination intensities added by the above-described two lights. That is, the texture coordinate value is the brightness vector. Note that the value of the first illumination intensity is used as the S component of the texture coordinate value, and the value of the second illumination intensity is used as the T component of the texture coordinate value. That is, in the present embodiment, the value of the R component of the color data at the vertex of the polygon corresponds to the value of the S component, and the value of the G component of the color data at the vertex of the polygon corresponds to the value of the T component. The texture color determining section 523 determines a texture color based on the texture coordinate value generated in the above-described manner. A texture coordinate system and the texture color are described below with reference to FIGS. 6A and 6B.

Figure 6A:
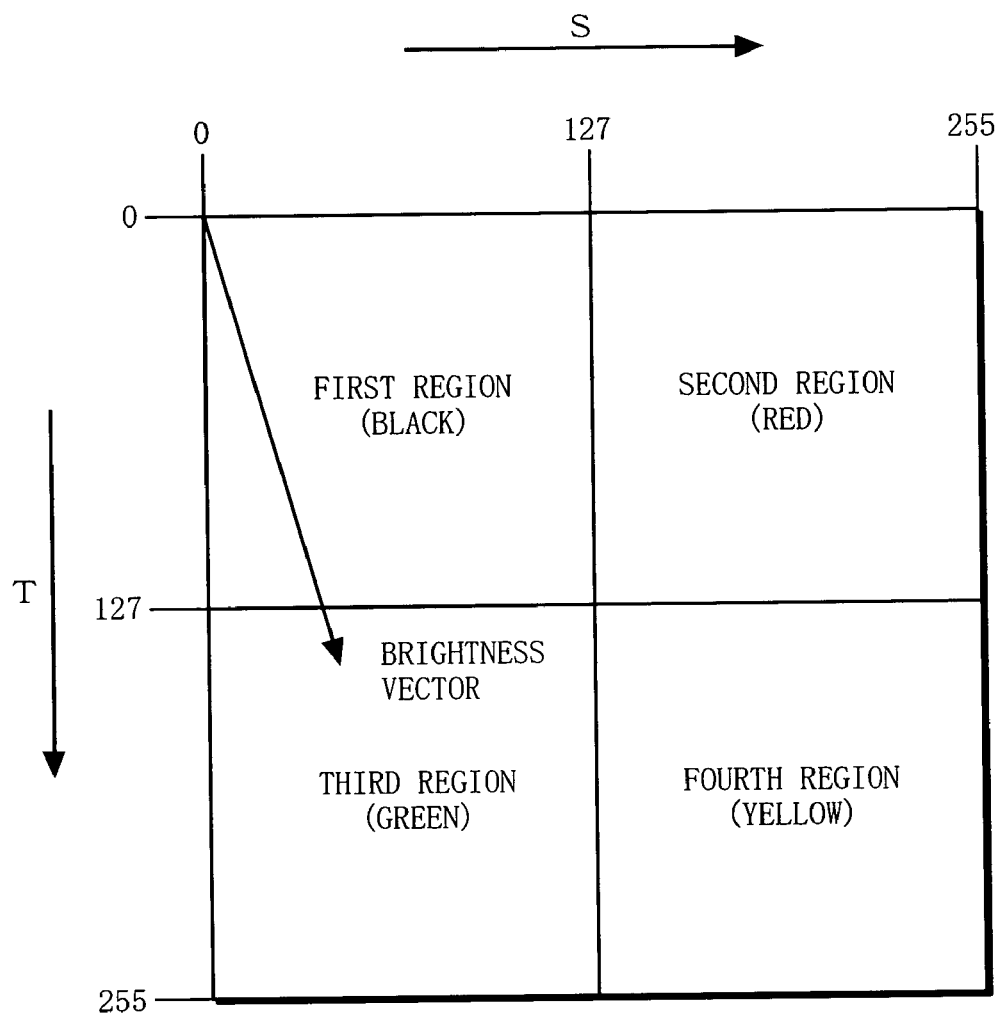
FIG. 6A is a diagram illustrating a texture coordinate system used in an illustrative embodiment of the present invention.
Figure 6B:
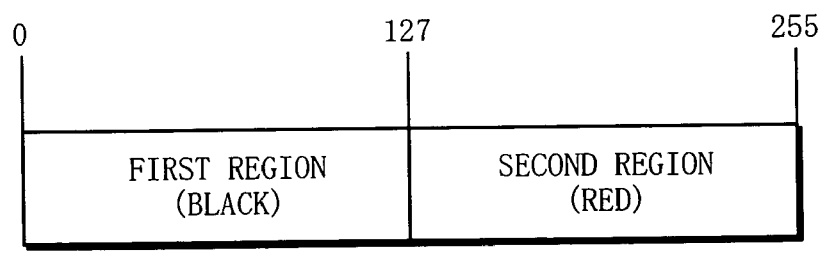
FIG. 6B is a diagram illustrating a texture coordinate system used in another illustrative embodiment of the present invention.

FIG. 6A is a diagram illustrating the texture coordinate system used in the present embodiment. In the texture coordinate system illustrated in FIG. 6A, the horizontal axis represents a value of the S component, and the vertical axis represents a value of the T component. That is, the texture coordinate system is a coordinate region defined by the coordinate axes each representing a component of the brightness vector. A first threshold value is set for the horizontal axis (the S component), and a second threshold value is set for the vertical axis (the T component). In FIG. 6A, both the first and second threshold values are 127. The coordinate region of the texture coordinate system is divided into four regions (first through fourth regions) with reference to the first and second threshold values. Four texture colors, i.e., black, red, green, and yellow, are assigned to the four regions. The texture color determining section 523 determines a texture color using the texture coordinate system as described above. Specifically, the display color of the object is determined in accordance with the coordinate regions obtained via the division by the threshold values. That is, the display colors are determined based on which one of the regions obtained via the division by the threshold values includes a texture coordinate value (the tip of the brightness vector).

In the present embodiment, when the texture coordinate value is included in the first region (when the texture color is black), a dark color (a first basic display color) representing a dark portion of the object is set as the display color. Alternatively, when the texture coordinate value is included in the second region (when the texture color is red), a light color (a second basic display color) representing a bright portion of the object is set as the display color. Thus, it is appreciated that display colors having different brightness are set in accordance with the relationship in size between the first illumination intensity and the first threshold value. When the texture coordinate value is included in the third or fourth region (when the texture color is green or yellow), an effect display color (a third basic display color) is set as the display color. Thus, it is appreciated that the display color is set by selecting either the color of the object to which a special effect is added or the color of the object in a normal state in accordance with the relationship in size between the second illumination intensity and the second threshold value. In the present embodiment, eventually, the same color is set as the display color when the texture coordinate value is included in either the third or fourth region, and therefore the third and fourth regions may be considered as one region.

In order to clarify the features of the illustrative embodiments, a case of determining the texture color when only one light is used is described with reference to FIG. 6B. When only one light is used (in this case, the red light is used), only one illumination intensity is detected at a polygon, and therefore the two-dimensional texture coordinate system as illustrated in FIG. 6A is not used. In FIG. 6B, either one of two texture colors (black or red) is selected in accordance with the relationship in size between a threshold value and the illumination intensity detected at the polygon.

The following is a detailed description as to how the texture color is determined in accordance with the present embodiment. The texture color determining section 523 detects the relationship in size between the value of the S component and the first threshold value. Specifically, it is determined whether the value of the S component is greater than the first threshold value. In other words, the value of the S component represented in 256 shades of color is converted into a value represented in two shades of color in accordance with the size relative to the first threshold value. Similar to the S component, the value of the T component represented in 256 shades of color is converted into a value represented in two shades of color in accordance with the size relative to the second threshold value. In this manner, toon conversion is performed. Which one of the four regions of the texture coordinate system includes the texture coordinate value (the brightness vector) (S,T) can be known from the relationship in size between the value of the S component and the first threshold value and the relationship in size between the value of the T component and the second threshold value. Since the four regions have their respective texture colors assigned thereto, the texture color can be determined based on which region includes the texture coordinate value. For example, in the case of the texture coordinate value (10,10), the coordinate value is present in the first region, and therefore the texture color is determined as black. Alternatively, in the case of the texture coordinate value (230,10), the coordinate value is present in the second region, and therefore the texture color is determined as red. In this manner, the texture color of the polygon is obtained based on the illumination intensities of the two lights.

The display color determining section 524 determines the display color of each polygon in accordance with the region including the texture coordinate value, i.e., in accordance with the texture color. Specifically, display colors of polygons are determined based on texture colors assigned to four regions. Accordingly, one of four or less colors (in the present embodiment, three colors) is selected as the display color of each polygon, and therefore the object is displayed such that the display color thereof distinctly varies, i.e., a cartoon-like object is displayed. Note that display color data indicating the display color is represented by RGB values. Specifically, in the present embodiment, the display color is determined based on the texture color and a basic display color predetermined for the object. Detailed description as to how the display color is determined in accordance with the present embodiment will be provided later.

The texture combining section 525 converts the display color determined by the display color determining section 524 into a shading color, and generates video color data by combining the shading color with image data representing a texture, i.e., a design or patterns, which is predetermined for each polygon of the object. The video color data as described herein refers to data representing a video color for determining a display state as to how the object is displayed on the television 105. Note that the above-described texture (a design or patterns) is different from the texture described in conjunction with the texture coordinate generating section 522 and the texture color determining section 523. In the case where it is not necessary to form a different design or different patterns for each polygon, the display color may be used as the video color.

The video signal generating section 53 generates a display signal for displaying an image on the television 105, based on the video color data generated by the texture processing section 52. The video signal generating section 53 corresponds to the video I/F 209 illustrated in FIG. 2. As described above, the game apparatus according to the present embodiment obtains a value of a multi-dimensional illumination intensity (a brightness vector) using two or more lights, thereby making it possible to use toon shading to display the state of the object illuminated by light beams from two or more places.

Figure 7:
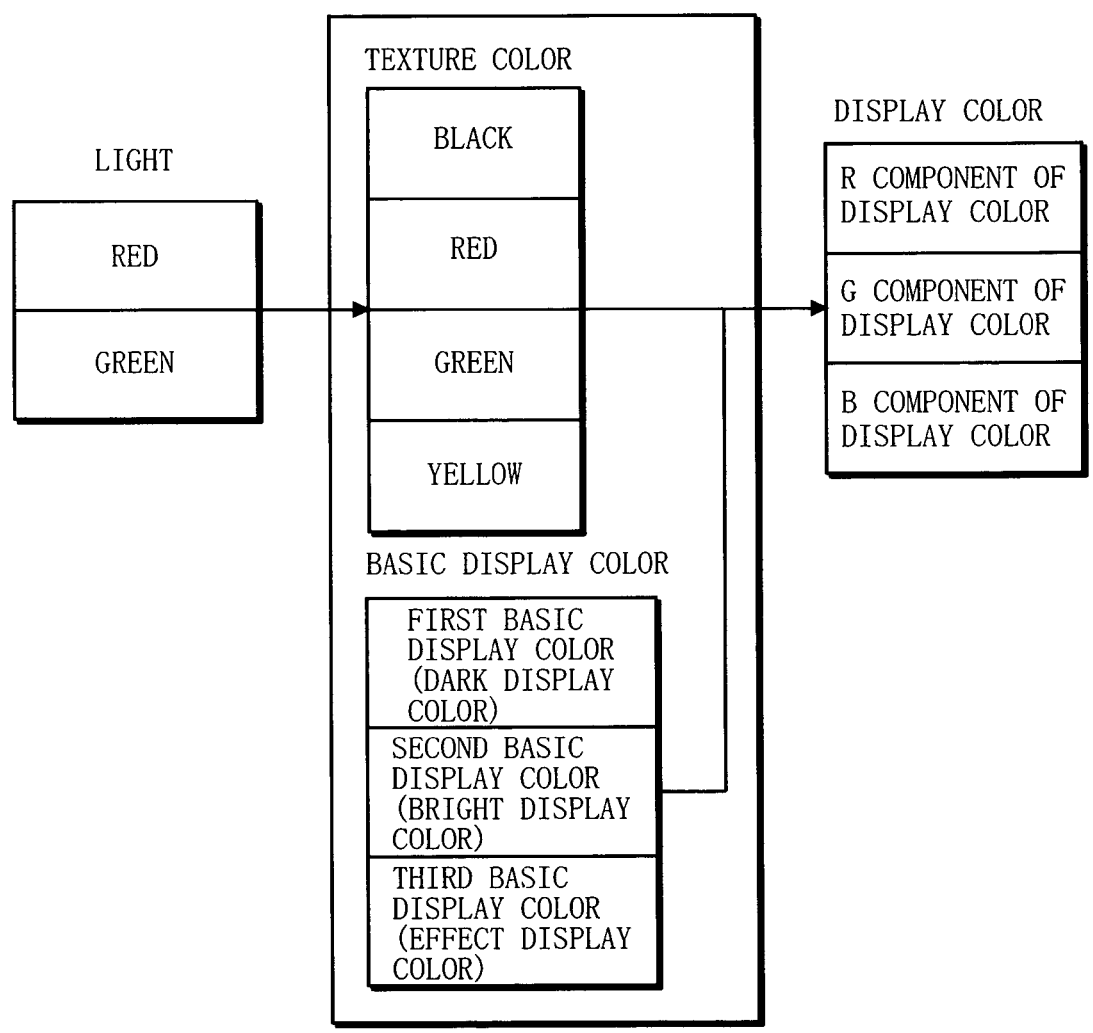
FIG. 7 is a diagram illustrating the relationship among color data used in the game apparatus illustrated in FIG. 1.

Next, detailed description as to how the display color is determined in accordance with the present embodiment is described with reference to FIG. 7. FIG. 7 is a diagram illustrating the relationship among color data used in the game apparatus according to the present embodiment. As described above, texture colors (black, red, green, and yellow) of polygons forming the object are initially determined by two lights having different colors (red and green lights). In the present embodiment, a mixture ratio ($\alpha$) and an addition ratio ($\beta$) are obtained for each texture color determined in a manner as described above. Each texture color has its values of the mixture ratio and addition ratio, and for example, the game apparatus previously stores a table in which each texture color is associated with a pair of a mixture ratio and an additional ratio. Further, different values of the mixture ratio and addition ratio are provided for each texture color. For example, an R component of color data for a texture color may be used as the value of the mixture ratio, and a G component of the color data for the texture color may be used as the value of the addition ratio.

The display color is determined based on the mixture and addition ratios previously determined in a manner as described above, and based on the basic display color stored in the main memory 205. Specifically, the display color is determined based on the following expression (1) using the mixture and addition ratios and the basic display color, $$\text{(Display color)} = (C_1) \times \alpha + (C_2) \times (1-\alpha) + (C_3) \times \beta \quad (1),$$

where C1 is color data for a first basic display color, C2 is color data for a second basic color, C3 is color data for a third basic display color, $\alpha$ is a mixture ratio, and $\beta$ is an additional ratio. Here, the mixture ratio $\alpha$ is a value within the range from 0 to 1 which is determined based on the value (0 to 255) of the R component of the texture color; the addition ratio $\beta$ is a value within the range from 0 to 1 which is determined based on the value (0 to 255) of the G component of the texture color. As described above, the display color is generated so as to be represented by RGB values, and therefore the expression (1) can be represented by:

$$O_r = (C_{1r}) \times \alpha + (C_{2r}) \times (1-\alpha) + (C_{3r}) \times \beta \quad (2);$$

$$O_g = (C_{1g}) \times \alpha + (C_{2g}) \times (1-\alpha) + (C_{3g}) \times \beta \quad (3); \text{ and}$$

$$O_b = (C_{1b}) \times \alpha + (C_{2b}) \times (1-\alpha) + (C_{3b}) \times \beta \quad (4),$$

where $O_r$ is the R component of the display color, $O_g$ is the G component of the display color, and $O_b$ is the B component of the display color. $C_{1r}$, $C_{1g}$, and $C_{1b}$ are the R component, the G component, and the B component, respectively, of $C_1$.

Similar to $C_{1r}$, $C_{1g}$, and $C_{1b}$, $C_{2r}$, $C_{2g}$, and $C_{2b}$ are the R component, the G component, and the B component, respectively, of $C_2$, and $C_{3r}$, $C_{3g}$, and $C_{3b}$ are the R component, the G component, and the B component, respectively, of $C_3$. In the display color determining section 524, the above expressions (2) through (4) are used to calculate the RGB values of the display color data. Note that in the case of using the mixture and addition ratios, a final display color may or may not be the same as any one of the first through third basic display colors depending on how the mixture and addition ratios are set. Even in such a case, the final display color consists of three (or four) color components.

As described above, in the present embodiment, the mixture and addition ratios are determined in accordance with the texture color, and the display color is determined in accordance with the mixture and addition ratios. In other embodiments, the basic display color may be directly determined as the display color in accordance with the texture color. Specifically, a table in which texture colors are associated with basic display colors is previously prepared for each object, and a basic display color, which is uniquely determined in accordance with a texture color of a target polygon, is determined as the display color of that polygon. For example, when the texture color is black, the first basic display color is determined as the display color. Alternatively, when the texture color is red, the second basic display color is determined as the display color. Alternatively still, when the texture color is green or yellow, the third basic display color is determined as the display color. On the other hand, the present embodiment uses the mixture and addition ratios, and therefore it is not necessary to prepare such a table as described above, so that memory of the game apparatus can be saved.

Figure 8:
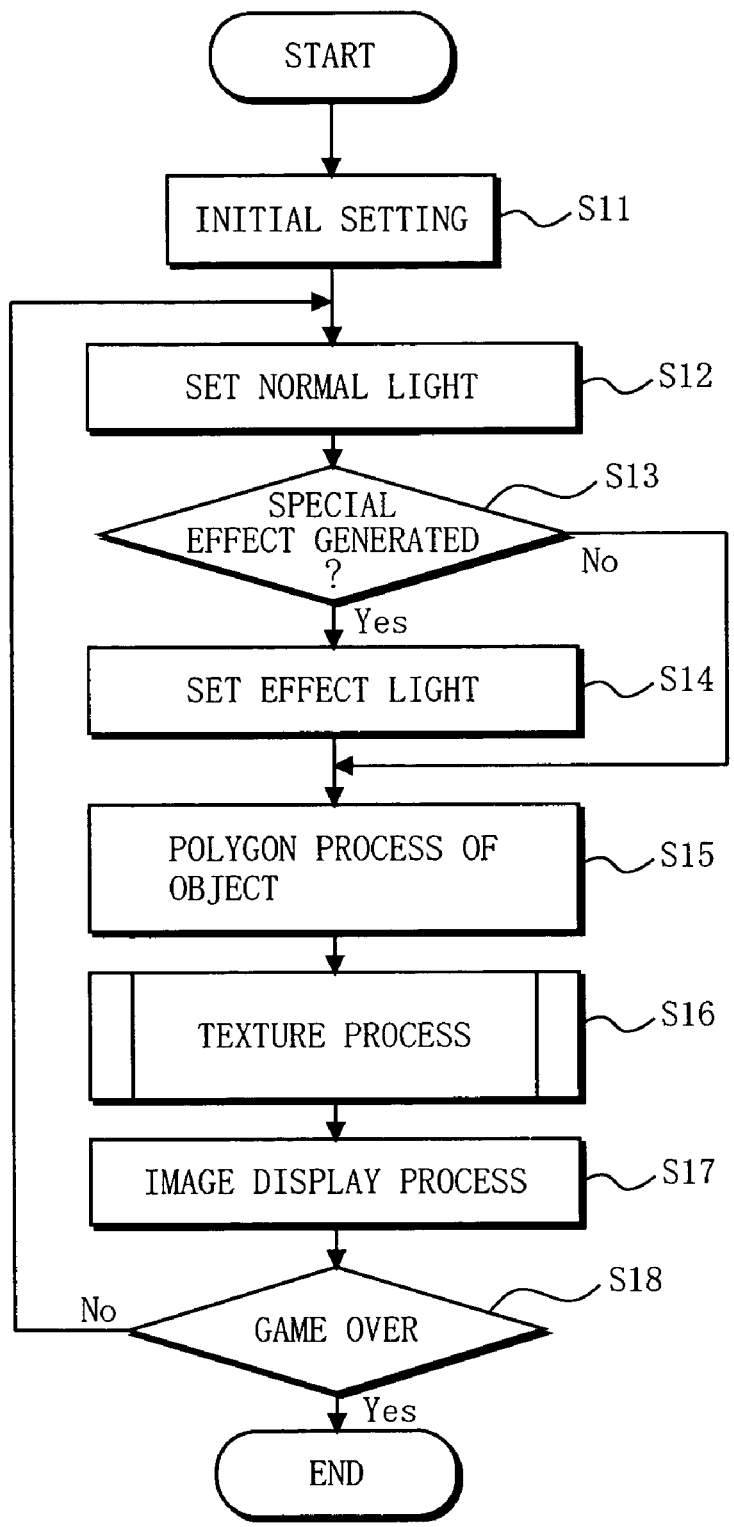
FIG. 8 is a flowchart illustrating the procedure of game processing performed in accordance with a collaborative operation of a CPU 202 and a GPU 204 of the game apparatus illustrated in FIG. 1.

Next, processing performed by the game apparatus according to the present embodiment is described in detail. FIG. 8 is a flowchart illustrating the procedure of game processing performed in accordance with a collaborative operation of the CPU 202 and the GPU 204 of the game apparatus. In the present embodiment, although the game processing is performed in accordance with a collaborative operation of the CPU 202 and the GPU 204, it is possible to enable, for example, only the CPU 202 to perform substantially the entire game processing including geometry processing.

Upon the start of the game, initial setting is performed at step S11. Specifically, the initial setting includes initialization of variables used in the game processing, formation of the game space, etc. Next, at step S12, a first light is set in a predetermined position of the game space. Here, it is assumed that the first light emits a red light beam as described above. The first light is used for adding a normal shading effect (a shading effect in the case where no special effect is generated) to the object. Accordingly, in the following description, the first light is interchangeably referred to as the "normal light". The term "special effect" as described herein refers to an event generated during the game, such as lightning or explosion, which necessitates a virtual light to irradiate the object with a light beam. The special effect may be generated when a predetermined condition is satisfied during the game, e.g., when a bomb is exploded. Alternatively, the special effect may be generated by the player's operation.

Following step S12, at step S13, it is determined whether the special effect is generated in the game space. At step S13, if it is determined that the special effect is generated, processes at step S14 and S15 are sequentially performed. On the other hand, if it is not determined that the special effect is generated, step S14 is skipped and the process at step S15 is performed immediately after step S13.

At step S14, a second light is set in a predetermined position in the game space. Here, it is assumed that the second light emits a green light beam as described above. The second light is used for shading the object as a result of a special effect. Accordingly, in the following description, the second light is interchangeably referred to as the "effect light".

At step S15, a polygon process is performed on the object. Specifically, polygons are generated to form the object in the game space. Note that the process at step S15 corresponds to an operation performed by the polygon processing section 51 illustrated in FIG. 5. At the subsequent step S16, a texture process is performed. The texture process corresponds to an operation performed by the texture processing section 52 illustrated in FIG. 5. The details of the texture process are described below.

Figure 9:
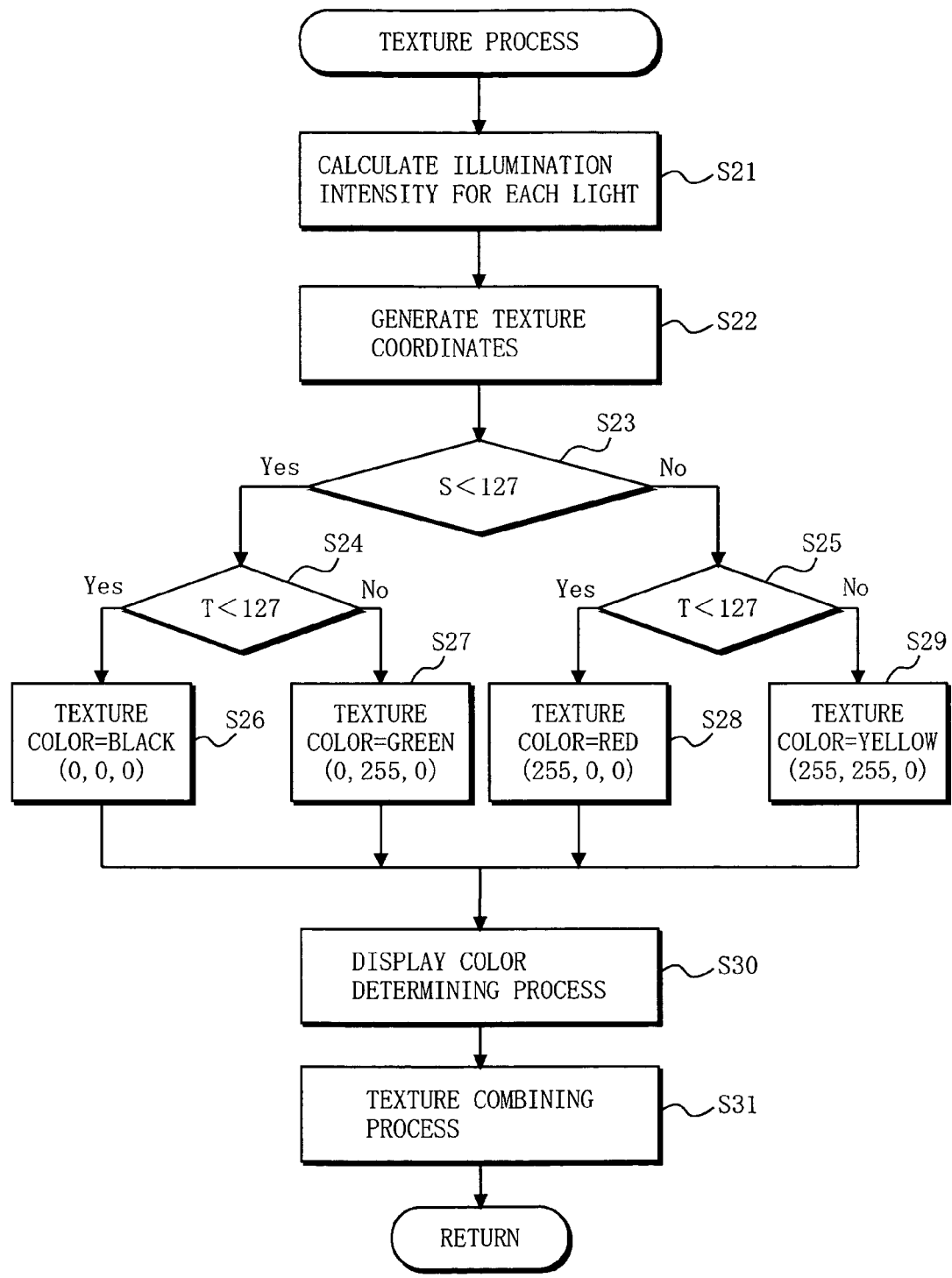
FIG. 9 is a flowchart illustrating the details of step S16 shown in FIG. 8.

FIG. 9 is a flowchart illustrating the details of step S16 shown in FIG. 8. First, at step S21, an illumination intensity is calculated for each vertex of the polygons generated at step S15. Specifically, a value of the R component of color data of each vertex of the polygons is calculated as a first illumination intensity, and a value of the G component of color data of each vertex of the polygons is calculated as a second illumination intensity. The process at step S21 corresponds to an operation performed by the brightness calculating section 521 illustrated in FIG. 5.

At step S22, texture coordinates (S,T) are generated based on the first and second illumination intensities calculated at step S21. Specifically, a value of the first illumination intensity is obtained as the value of the S component of the texture coordinates, and a value of the second illumination intensity is obtained as the value of the T component of the texture coordinates. The process at step S22 corresponds to an operation performed by the texture coordinate generating section 522 illustrated in FIG. 5. A brightness vector is calculated by performing the above-described steps S21 and S22.

Following step S22, texture colors are determined at steps S23 through S29. That is, processes at steps S23 through S29 corresponds to an operation performed by the texture color determining section 523 illustrated in FIG. 5. First, at step S23, it is determined whether the value of the S component of the texture coordinates is greater than a first threshold value. Specifically, by comparing the value of the S component of the texture coordinates generated at step S22 (i.e., the first illumination intensity) with the first threshold value stored in the threshold data storage region 205e, the relationship in size between these values is determined. If it is determined at step S23 that the value of the S component of the texture coordinates is smaller than the first threshold value, the process at step S24 is performed. On the other hand, if it is determined at step S23 that the value of the S component of the texture coordinates is greater than the first threshold value, the process at step S25 is performed.

At step S24, it is determined whether the value of the T component of the texture coordinates is smaller than a second threshold value. Specifically, by comparing the value of the T component of the texture coordinates generated at step S22 (i.e., the second illumination intensity) with the second threshold value stored in the threshold data storage region 205e, the relationship in size between these values is determined. If it is determined at step S24 that the value of the T component of the texture coordinates is smaller than the second threshold value, the process at step S26 is performed. On the other hand, if it is determined at step S24 that the value of the T component of the texture coordinates is greater than the second threshold value, the process at step S27 is performed.

At step S25, a process similar to that performed at step S24 is performed. Specifically, if it is determined at step S25 that the value of the T component of the texture coordinates is smaller than the second threshold value, the process at step S28 is performed. On the other hand, if it is determined at step S25 that the value of the T component of the texture coordinates is greater than the second threshold value, the process at step S29 is performed.

At step S26, the texture color is determined as black. Specifically, color data (0,0,0) for black stored in the texture color data storage region 205c is selected as texture color data. In this manner, the texture color is determined as black in the case where a color at a vertex of a polygon colored by the first and second lights is close to black, i.e., in the case where the first illumination intensity is smaller than the first threshold value and the second illumination intensity is smaller than the second threshold value.

Alternatively, at step S27, the texture color is determined as green. Specifically, color data (0,255,0) for green stored in the texture color data storage region 205c is selected as the texture color data. In this manner, the texture color is determined as green in the case where a color at a vertex of the polygon colored by the first and second lights is close to green, i.e., in the case where the first illumination intensity is smaller than the first threshold value and the second illumination intensity is greater than the second threshold value.

Alternatively still, at step S28, the texture color is determined as red. Specifically, color data (255,0,0) for red stored in the texture color data storage region 205c is selected as the texture color data. In this manner, the texture color is determined as red in the case where a color at a vertex of the polygon colored by the first and second lights is close to red, i.e., in the case where the first illumination intensity is greater than the first threshold value and the second illumination intensity is smaller than the second threshold value.

Alternatively still, at step S29, the texture color is determined as yellow. Specifically, color data (255,255,0) for yellow stored in the texture color data storage region 205c is selected as the texture color data. In this manner, the texture color is determined as yellow in the case where a color at a vertex of the polygon colored by the first and second lights is close to yellow, i.e., in the case where the first illumination intensity is greater than the first threshold value and the second illumination intensity is greater than the second threshold value.

Following the process at either one of steps S26 through S29, at step S30, the display color of the polygon is determined based on the texture color data. Specifically, the mixture and addition ratios are initially determined based on the texture color data. Next, the RGB values of the display color are determined by substituting into the above expressions (2) through (4) the mixture and addition ratios and the color data for the first through third basic display colors stored in the basic display color data storage region 205d. Note that the process at step S30 corresponds to an operation performed by the display color determining section 524 illustrated in FIG. 5.

Following step S30, a texture combining process is performed at step S31. Specifically, video color data is generated by combining the display color (the shading color) determined at step S30 with image data representing a texture, i.e., a design or patterns, which is predetermined for each polygon of the object. Note that the process at step S31 corresponds to an operation performed by the texture combining section 525 illustrated in FIG. 5. After the completion of step S31, the texture process is completed. The above described texture process is performed for each polygon of objects in the game space.

Referring to FIG. 8, at step S17, an image display process is performed. Specifically, an image is displayed on the television 105 based on the video color data generated by the texture process at step S16. At the subsequent step S18, whether to complete the game is determined. For example, it is determined whether the game is over or whether the player performs an operation for completing the game. If it is determined that the game should not be completed, the procedure returns to step S12, and a series of processes at steps S12 through S18 are repeatedly performed until the game is completed. On the other hand, if it is determined that the game should be completed, the game processing illustrated in FIG. 8 is terminated.

Described next is an exemplary display of the object displayed by the game apparatus according to the present embodiment. FIG. 10 is a diagram illustrating an exemplary display of the object displayed in the case where a special effect is generated. In the case where the special effect is generated, a normal light (a red light) 64 and an effect light (a green light) 65 are set (refer to steps S12 through S14 of FIG. 8). By using the two lights as shown in FIG. 10, the toon shading effect can be enabled even in the case where the object is irradiated with light from different angles. As described above, in the present embodiment, the display color of a single object is selected from three types of display colors. Specifically, any one of the three types of display colors is set for each polygon of the object based on the relationship in size between the first illumination intensity and the first threshold value, and based on the relationship in size between the second illumination intensity and the second threshold value. As a result, the single object (e.g., the left arm of the gorilla illustrated in FIG. 10) is separated into three parts, i.e., a part 61 for which a bright display color is set, a part 62 for which a dark display color is set, and a part 63 for which a display color provided due to a special effect (the effect display color) is set. In the part 63 for which the effect display color is set, the second illumination intensity is equal to or greater than the second threshold value (refer to step S27 or S29 in FIG. 9). In the part 61 for which the bright display color is set, the first illumination intensity is equal to or greater than the first threshold value and the second illumination intensity is smaller than the second threshold value. In the part 62 for which the dark display color is set, the first illumination intensity is smaller than the first threshold value and the second illumination intensity is smaller than the second threshold value.

Figure 11:
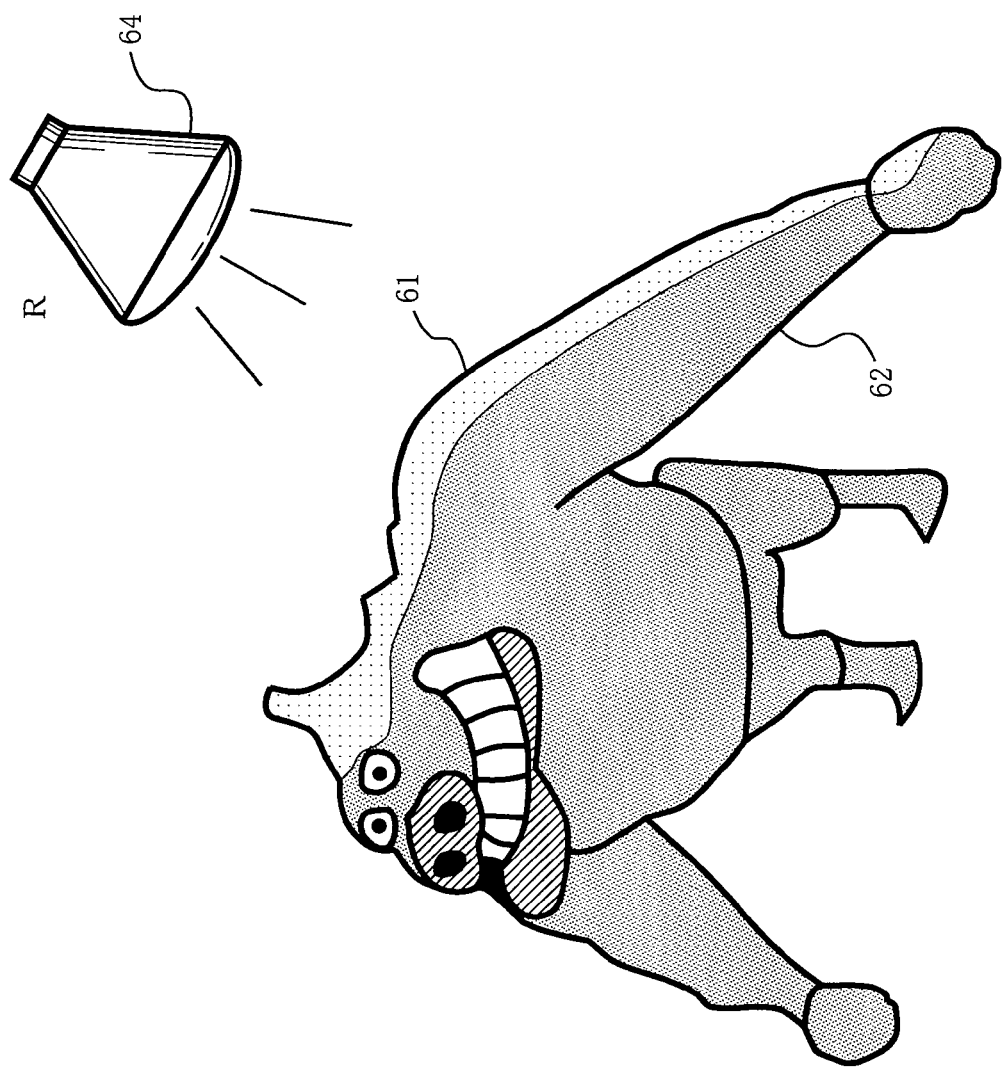
FIG. 11 is a diagram illustrating an exemplary display of an object displayed in the case where no special effects are generated.
Figure 11:
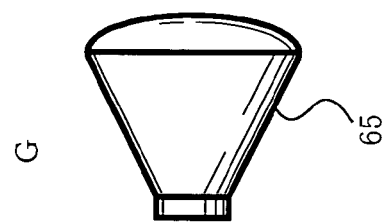
Figure 12:
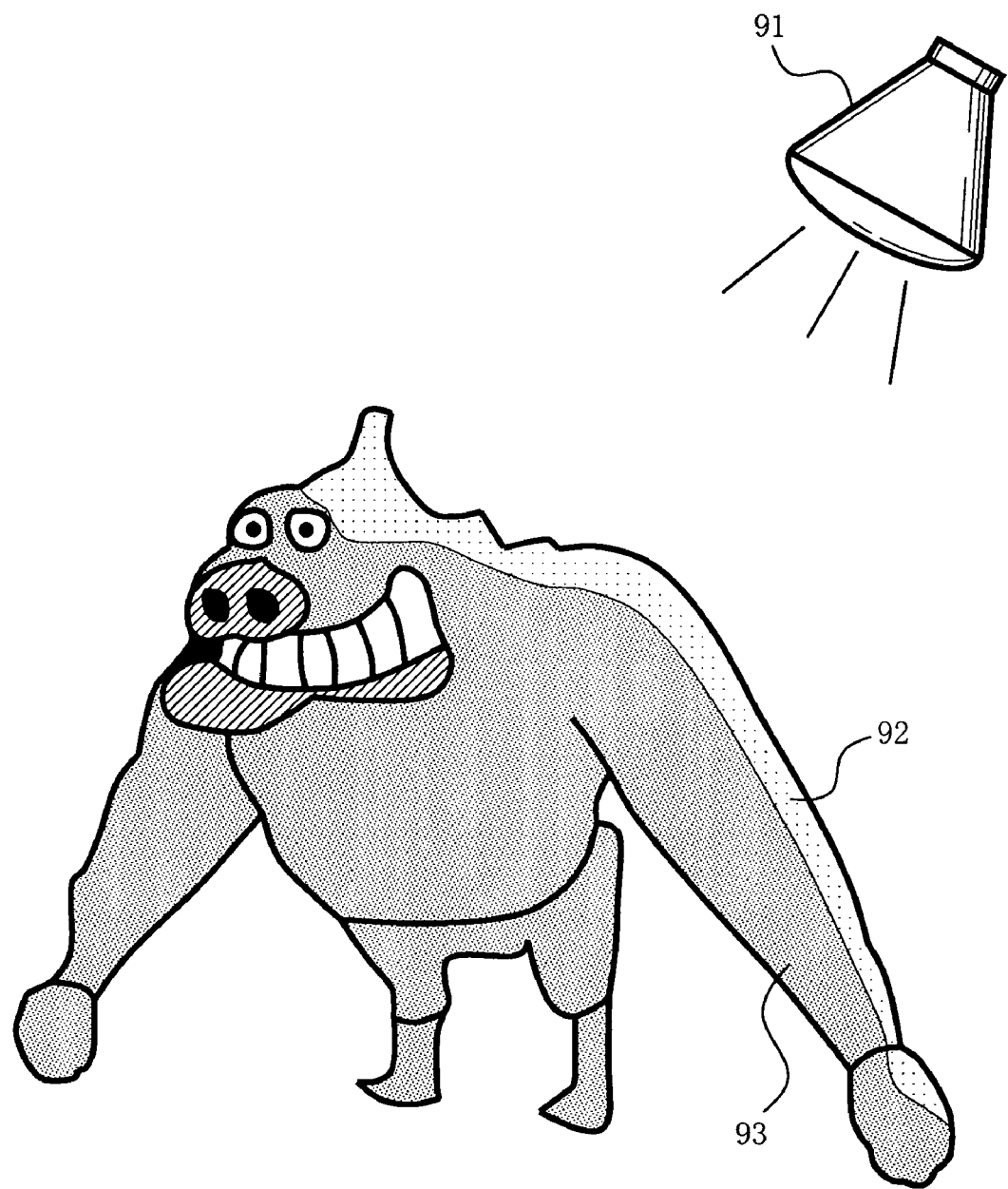
FIG. 12 is a diagram illustrating an exemplary display of an image generated by a conventional technology using toon shading.

FIG. 11 is a diagram illustrating an exemplary display of the object displayed in the case where no special effects are generated. In the case where no special effect are generated, the normal light 64 is set, while the effect light 65 is not set (i.e., turned off). As a result, the second illumination intensity added to each polygon the object becomes "0" (S21 of FIG. 9), and the T component of the texture components also becomes "0" (S22 of FIG. 9). Accordingly, the texture color is set so as to be black or red (S24 through S29 of FIG. 9), and therefore the effect color is not set as the display color. Thus, the object (e.g., the left arm of the gorilla illustrated in FIG. 11) in the case where no special effects are generated is formed by only the part 61 for which the bright display color is set and the part 62 for which the dark display color is set.

Although the above embodiment has been described with respect to the case where the two lights are set in the game space, three or more light sources may be used. For example, in the case where three lights are used, the brightness vector becomes a three-dimensional vector, and the coordinate region of the texture coordinate system becomes a three-dimensional space. Even in such a case, the display color of each polygon can be determined in accordance with regions obtained via division by threshold values as can be determined in the above-described embodiment. Further, since the three lights are present, it is possible to represent the object illuminated by light beams from three places. Note that in the case of using three lights, it is preferable that red, green, and blue are used as the colors of the lights.

In the case described in conjunction with FIG. 8, when no special effects are generated, no effect light is set (refer to steps S13 and S14 of FIG. 8). In other embodiments, when no special effects are generated, neither green nor yellow may be determined as the texture color. For example, in the case where no special effects are generated, T=0 may be set at step S22 of FIG. 9, instead of performing the process at step S14 of FIG. 8. This achieves an effect similar to that achieved by the above-described embodiment. Alternatively, in the case where no special effects are generated, by making a setting such that the determination at each of steps S24 and S25 of FIG. 9 is always positive, it is made possible to achieve an effect similar to that achieved by the above-described embodiment.

While the invention has been described in detail, the foregoing description is in all aspects illustrative and not restrictive. It is understood that numerous other modifications and variations can be devised without departing from the scope of the invention.

What is claimed is:

1. A game apparatus for displaying an object in a game space, the apparatus comprising:
   light source setting programmed logic circuitry for setting, in the game space, n light sources (where n is an integer equal to or more than 2) for irradiating the object with a light beam;
   a brightness calculator for calculating, for each of predetermined units forming the object, a brightness vector having as components n illumination intensities respectively added by the n light sources;
   at least one threshold value storage location having threshold values of the n illumination intensities stored therein, the threshold values being used for dividing a coordinate system for the brightness vector into at least three regions;
   region determining programmed logic circuitry for determining, for each of the predetermined units, a region including a tip of the brightness vector calculated by the brightness calculator from among the regions obtained via division by the threshold values based on whether or not the illumination intensity of each of the n illumination intensities is greater than, less than or equal to the corresponding threshold value; and
   display color determining programmed logic circuitry for determining a display color for each of the predetermined units based on the region determined for each of the predetermined units by the region determining programmed logic circuitry, such that the object's display color distinctly varies.

2. The game apparatus according to claim 1, wherein:
   the light source setting programmed logic circuitry sets a first light source emitting a light beam of a first color, and a second light source emitting a light beam of a second color which is different from the first color;
   wherein said brightness vector is composed of the illumination intensities corresponding to values of color components of the first and second colors; and
   the region determining programmed logic circuitry determines the region including the tip of the brightness vector by determining a relationship in size between the value of the color component of the first color and its corresponding first threshold value, and a relationship in size between the value of the color component of the second color and its corresponding second threshold value.

3. The game apparatus according to claim 2, wherein:
   the first color is either one of red, green, or blue; and
   the second color differs from the first color, and is either one of red, green, or blue.

4. The game apparatus according to claim 2, wherein:
   the coordinate system is divided into different regions by the first threshold value, and is further divided into different regions by the second threshold value; and
   the display color determining programmed logic circuitry determines display colors of different brightness in accordance with the regions obtained by division by the first threshold value, and determines display colors of different types in accordance with the regions obtained by division by the second threshold value.

5. The game apparatus according to claim 4, wherein the display color determining programmed logic circuitry determines, in accordance with the regions obtained by division by the second threshold value, either a color used for representing an object influenced by a special effect generated in the game space or a color used for representing an object in the case where no special effects are generated.

6. The game apparatus according to claim 5, further comprising special effect determining programmed logic circuitry for determining whether the special effect is generated in the game space, wherein the light source setting programmed logic circuitry provides the second light source only when the special effect determining programmed logic circuitry determines that the special effect has been generated.

7. The game apparatus according to claim 1, further comprising at least one display color storage location having basic display colors stored therein, the basic display colors being used for determining the display color of each object, wherein the display color determining programmed logic circuitry determines the display color based on the region determined by the region determining programmed logic circuitry and the basic display colors stored in the at least one display color storage location.

8. The game apparatus according to claim 7, wherein:
   the region determining programmed logic circuitry represents a determined region by a numerical value; and
   the display color determining programmed logic circuitry determines the display color by performing a predetermined calculation using the numerical value representing the region determined by the region determining programmed logic circuitry and color data for the basic display colors.

9. The game apparatus according to claim 1, wherein the predetermined units are polygons forming the object.

10. A game apparatus for displaying an object in a game space, the apparatus comprising:
    first light source setting programmed logic circuitry for setting, in the game space, a first light source for irradiating the object with a light beam;
    second light source setting programmed logic circuitry for setting, in the game space, a second light source which is different from the first light source;
    a brightness calculator for calculating, for each of predetermined units forming the object, a first illumination intensity added by the first light source and a second illumination intensity added by the second light source;

at least one threshold value storage location having threshold values of the first and second illumination intensities stored therein;

first detecting programmed logic circuitry for detecting, for each of the predetermined units, whether the first illumination intensity is greater than, less than, or equal to the corresponding threshold value;

second detecting programmed logic circuitry for detecting, for each of the predetermined units, whether the second illumination intensity is greater than, less than, or equal to the corresponding threshold value; and display color determining programmed logic circuitry for determining a display color for each of the predetermined units based on detection results obtained for each of the predetermined units by the first and second detecting programmed logic circuitry, such that the object's display color distinctly varies.

11. The game apparatus according to claim 10, wherein the predetermined units are polygons forming the object.

12. A computer-readable recording medium having a game program recorded therein, the game program causing a game apparatus to implement a game in which an object is displayed in a game space, the game program causing the game apparatus to implement:

setting, in the game space, n light sources (where n is an integer equal to or more than 2) for irradiating the object with a light beam;

calculating, for each of predetermined units forming the object, a brightness vector having as components n illumination intensities respectively added by the n light sources;

determining, for each of the predetermined units, a region including a tip of the brightness vector calculated by the calculating from among at least three regions into which a coordinate system for the brightness vector is divided by threshold values of the n illumination intensities, based on whether or not the illumination intensity of each of the n illumination intensities is greater than, less than or equal to the corresponding threshold value; and determining a display color for each of the predetermined units based on the region determined for each of the predetermined units by the determining a region, such that the object's display color distinctly varies.

13. The computer-readable recording medium according to claim 12, wherein:

the setting sets a first light source emitting a light beam of a first color, and a second light source emitting a light beam of a second color which is different from the first color;

wherein the brightness vector is composed of the illumination intensities corresponding to values of color components of the first and second colors; and determining a region determines the region including the tip of the brightness vector by determining a relationship in size between the value of the color component of the first color and its corresponding first threshold value, and a relationship in size between the value of the color component of the second color and its corresponding second threshold value.

14. The computer-readable recording medium according to claim 13, wherein:

the first color is either one of red, green, or blue; and
the second color differs from the first color, and is either one of red, green, or blue.

15. The computer-readable recording medium according to claim 13, wherein:

the coordinate system is divided into different regions by the first threshold value, and is further divided into different regions by the second threshold value; and determining a display color determines display colors of different brightness in accordance with the regions obtained by division by the first threshold value, and determines display colors of different types in accordance with the regions obtained by division by the second threshold value.

16. The computer-readable recording medium according to claim 15, wherein the determining a display color determines, in accordance with the regions obtained by division by the second threshold value, either a color used for representing an object influenced by a special effect generated in the game space or a color used for representing an object in the case where no special effects are generated.

17. The computer-readable recording medium according to claim 16, wherein:

the game program further causes the game apparatus to implement determining whether the special effect is generated in the game space; and the setting provides the second light source only when the determining whether the special effect is generated determines that the special effect has been generated.

18. The computer-readable recording medium according to claim 12, wherein:

the game apparatus has basic display colors stored therein, the basic display colors being used for determining the display color of each object; and the determining a display color determines the display color based on the region determined at the determining a region and the basic display colors stored in the game apparatus.

19. The computer-readable recording medium according to claim 18, wherein:

the determining a region represents a determined region by a numerical value; and the determining a display color determines the display color by performing a predetermined calculation using the numerical value representing the region determined at the determining a region and color data for the basic display colors.

20. The computer-readable recording medium according to claim 12, wherein the predetermined units are polygons forming the object.

21. A computer-readable recording medium having a game program recorded therein, the game program causing a game apparatus to implement a game in which an object is displayed in a game space, the game program causing the game apparatus to implement:

setting, in the game space, a first light source for irradiating the object with a light beam;

setting, in the game space, a second light source which is different from the first light source;

calculating, for each of predetermined units forming the object, a first illumination intensity added by the first light source and a second illumination intensity added by the second light source;

detecting, for each of the predetermined units, whether the first illumination intensity is greater than, less than, or equal to the corresponding threshold value;

detecting, for each of the predetermined units, whether the second illumination intensity is greater than, less than, or equal to the corresponding threshold value; and determining a display color for each of the predetermined units based on detection results obtained for each of the predetermined units by the detecting whether the first and second intensities are greater than, less than, or equal to the corresponding threshold values, such that the object's display color distinctly varies.

22. The computer-readable recording medium according to claim 21, wherein the predetermined units are polygons forming the object.

* * * * *